(12) United States Patent
Achir

(10) Patent No.: US 9,668,144 B2
(45) Date of Patent: May 30, 2017

(54) METHOD OF SHAPING THE SPECTRUM OF AN INPUT BITSTREAM

(71) Applicant: CANON KABUSHIKI KAISHA, Tokyo (JP)

(72) Inventor: Mounir Achir, Chantepie (FR)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 14/631,563

(22) Filed: Feb. 25, 2015

(65) Prior Publication Data

US 2015/0245353 A1  Aug. 27, 2015

(30) Foreign Application Priority Data

Feb. 27, 2014  (GB) .................... 1403453.2

(51) Int. Cl.
| | |
|---|---|
| H04L 27/04 | (2006.01) |
| H04L 27/06 | (2006.01) |
| H04W 16/14 | (2009.01) |
| H04L 27/20 | (2006.01) |
| H04L 1/00 | (2006.01) |
| H04L 25/03 | (2006.01) |
| H04L 25/49 | (2006.01) |

(52) U.S. Cl.
CPC ........... H04W 16/14 (2013.01); H04L 1/00 (2013.01); H04L 25/03828 (2013.01); H04L 25/4908 (2013.01); H04L 27/20 (2013.01); H04L 1/0041 (2013.01)

(58) Field of Classification Search
CPC ......... H03M 5/145; H04L 1/00; H04L 1/0083
USPC ....................................... 375/340
See application file for complete search history.

(56) References Cited

U.S. PATENT DOCUMENTS

| | | | |
|---|---|---|---|
| 4,855,742 A | 8/1989 | Verboom | |
| 6,496,540 B1 | 12/2002 | Widmer | |
| 6,501,396 B1 | 12/2002 | Kryzak et al. | |
| 6,711,121 B1 | 3/2004 | Gerakoulis et al. | |
| 2005/0012646 A1* | 1/2005 | Kang | H03M 5/02 341/58 |

FOREIGN PATENT DOCUMENTS

JP  H0936823 A  2/1997

OTHER PUBLICATIONS

Kim, et al., "White Paper on the MB810 Line Code for 10GbE", 1999, http://grouper.ieee.org/groups/802/3110G_study/public/sept99/kim_1_0999.pdf.

(Continued)

*Primary Examiner* — David S Huang
(74) *Attorney, Agent, or Firm* — Canon USA, Inc. I.P. Division

(57) ABSTRACT

Signal processing methods, signal processing device(s), signal processing system(s) and non-transitory information storage means are provided herein for shaping the spectrum of an input bitstream. In at least one embodiment, a signal processing method includes performing a plurality of line coding steps on respective parts of an input bitstream to obtain a plurality of respective line-coded signals, and multiplexing the plurality of line-coded signals to obtain a spectrum-shaped output signal. Embodiments provide a modulation scheme that makes it possible to shape the spectrum of a bitstream to be transmitted in order to match a channel transfer function of a communication medium.

23 Claims, 11 Drawing Sheets

(56) References Cited

OTHER PUBLICATIONS

Combined Search and Examination Report for GB App. No. 1403453.2, dated Aug. 26, 2014.
Hajduczenia, Marek, "64b/66b line code", ZTE Corporation.
Sklar, Bernard, "Digital Communications: Fundamentals and Applications", Prentice Hall 2001, ISBN: 0-13-084788-7, title page; table of contents (pp. v-xviii); pp. 370-374; pp. 418-420; pp. 450-454 and pp. 475-481.
Widmer, et al., "A DC-Balanced, Partitioned-Block, 8B/10B Transmission Code", IBM Journal of research and development, Sep. 1983, pp. 440-451, vol. 27, No. 5, International Business Machines Corporation.
Kallfass, et al., "All Active MMIC-Based Wireless Communication at 220 GHz", IEEE Transactions on Terahertz Science and Technology, Nov. 2011, pp. 477-487, vol. 1, No. 2.
Xu, et al., "D-Band CMOS Transmitter and Receiver for Multi-Giga-Bit/sec Wireless Data Link", 2010 (four pages).
"am Atmospheric Model", Harvard-Smithsonian Center for Astrophysics, Massachusetts, https://www.cfa.harvard.edu/~spaine/am/.
Rey, et al., "On Propagation Characteristics of Waveguide-like ABS-structures in 60 and 300 GHz communications".
Fricke, et al., "Reflection and transmission properties of plastic materials at THz frequencies".

\* cited by examiner

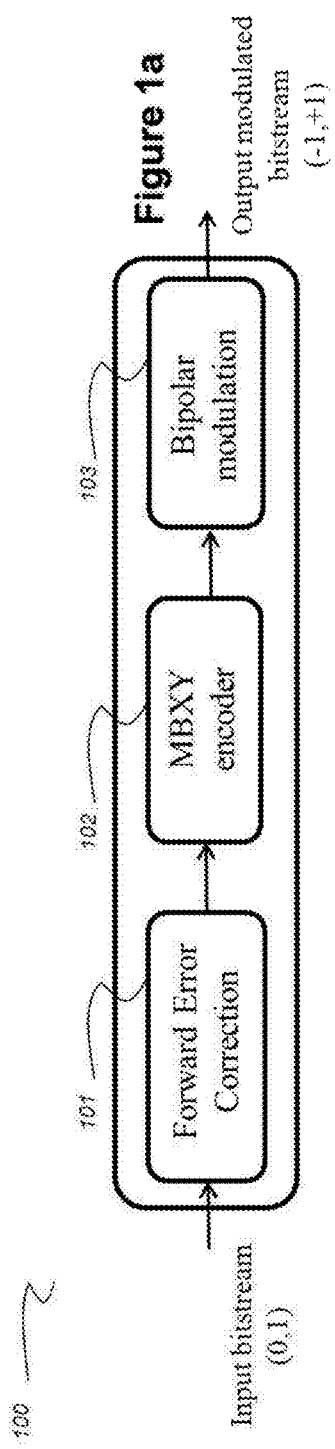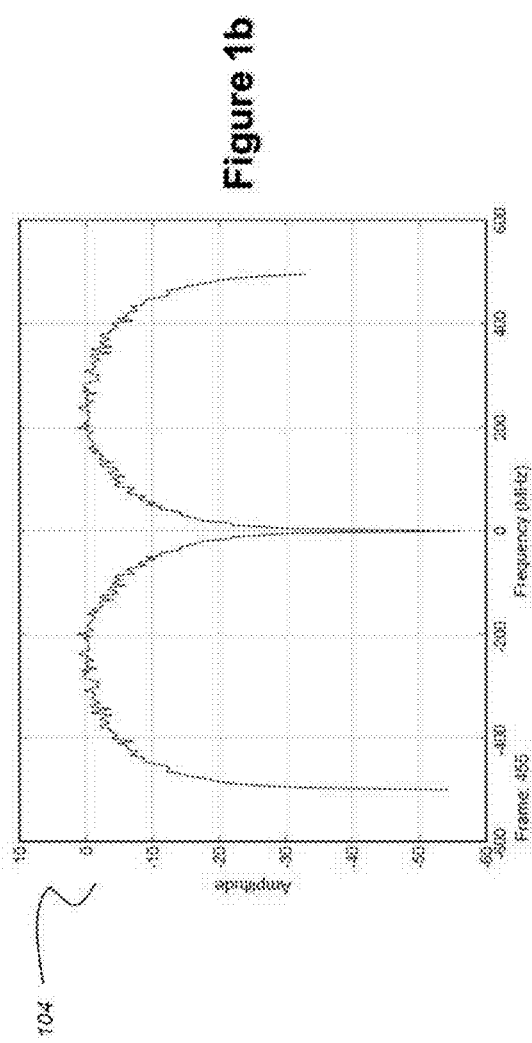

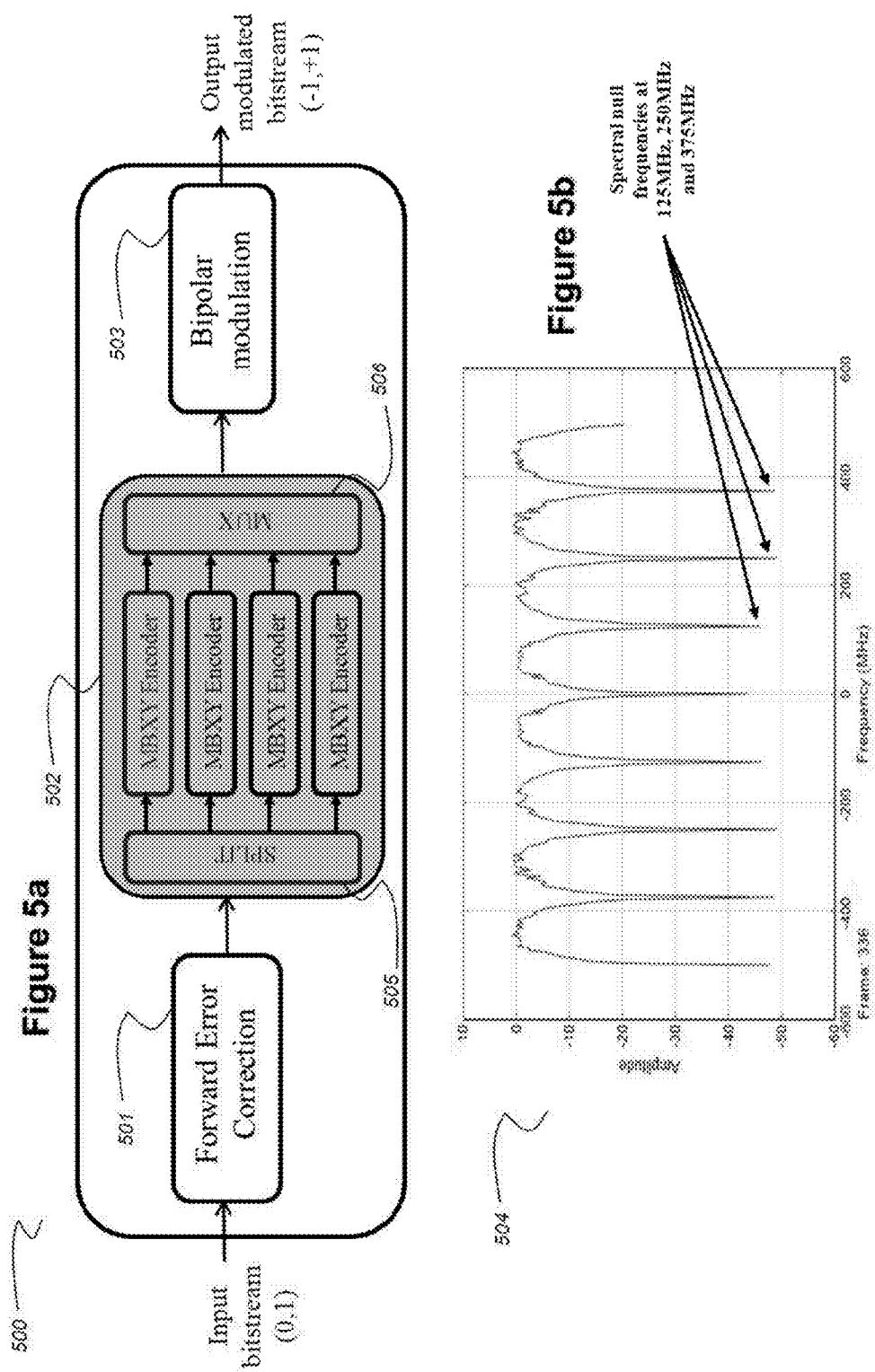

METHOD OF SHAPING THE SPECTRUM OF AN INPUT BITSTREAM

PRIORITY CLAIM/INCORPORATION BY REFERENCE

This application claims the benefit under 35 U.S.C. §119(a)-(d) of United Kingdom Patent Application No. 1403453.2, filed on Feb. 27, 2014, and entitled "Method of shaping the spectrum of an input bitstream", which is incorporated by reference herein in its entirety.

FIELD OF THE INVENTION

One or more embodiments discussed herein relate to spectral shaping of signals to be transmitted over a communication medium.

The electromagnetic spectrum is classically considered as separated into two large bands.

The first band includes the usual frequencies (referred to as the "radio waves") used for wireless communications. These radio waves are electromagnetic radiations having frequencies from 3 KHz up to 300 GHz.

The second band starts from around 1 THz, includes the optic radiations and encompasses the infrared, the visible, Ultraviolet, X-Rays and Gamma rays.

The so-called "terahertz band" contains the frequencies ranging from 100 GHz up to 10 THz, and hence includes a part of the radio electromagnetic radiations and a part of the optic electromagnetic radiations. The terahertz band is actually of particular interest and is considered for ultra-high speed wireless communications, principally due to its large available bandwidth. The frontiers of the terahertz band are not clearly defined; different values for the up and the down frequencies are considered in the literature. However, two bands are often used to define the terahertz band: 100 GHz up to 10 THz and 0.3 GHz up to 3 THz.

The large available bandwidth of the terahertz band is not its only advantage. The hardware used for terahertz communications (in particular the antennas) can be easily integrated in the current common communication devices the size of which is being reduced.

The integration being facilitated, several applications are possible, from ultra-high speed audio/image/video transfer between devices to intra-machine communications (i.e. wireless communication between two or more components inside one device).

Before bringing the terahertz communication technology to the market, many problems are to be solved. The terahertz technology is not yet mature even if it appears that solutions for Terahertz detection at room temperature exist as it appears from document Kallfass et al, "*All Active MMIC-Based Wireless Communication at 220 GHz*", IEEE Transactions on Terahertz Science and Technology Vol 1, Number 2, November 2011 and document Hiwei Xu et al, "*D-Band CMOS Transmitter and Receiver for Multi-Giga-Bit/sec Wireless Data Link*", 40th European Microwave Conference, September 2010.

Solutions for Terahertz generation (at room temperature) with sufficient power for transmission at distance over the meter are scarce. Experiments using only Amplitude Modulation were reported.

BACKGROUND OF THE INVENTION

There is still a need for experimental results concerning phase modulation and heterodyne architectures. There is also a need for reliable modular interconnection of hardware devices at Terahertz frequencies.

Furthermore, the antenna efficiency reported on silicon integrated antennas is still poor.

In parallel to the effort to develop terahertz transmitters and receivers capable of transmitting and receiving wideband modulated signals, the research community works also on the terahertz electromagnetic propagation modelling.

For the terahertz waves, as for radio waves, knowing the propagation model is important in order to well conceive and dimension the communication system, in particular for the digital part (Modulation and coding scheme) and the antenna design.

Only few models are actually available for the terahertz propagation. In document Kallfass et al., discussed hereinabove, one of the first models, developed by the HSCA (Harvard-Smithsonian Center for Astrophysics) is used. The model, which is available under a freeware that can be downloaded from the HSCA website, is called "am" for Atmospheric Model. The "am" model makes it possible to perform radiative transfer computations from microwave to sub-millimeter wavelengths. With this model, one can see that above around 350 GHz, for example, the humidity has no effect and the attenuation is more severe. This "am" model is available for outdoor and for long distance communications.

Recently, some measurements/modelling efforts are also directed to better understanding the behavior/propagation of the terahertz waves on specific scenarios completely different from those that have been considered for building the "am" model.

Document Sebastian Rey at al., "*On Propagation Characteristics of Waveguide-like ABS-structures in 60 GHz and 300 GHz communications*", IRMMW THz 2013, Mainz, Germany and document Alexander Fricke et al., "*Reflection and transmission properties of plastic materials at THz frequencies*", IRMMW THz 2013, Mainz, Germany investigate the behavior of the terahertz waves in indoor and intra-machine communications in order to characterize and determine the way that the terahertz waves propagate in such environment.

Simple modulation and coding schemes (MCS) are more appropriate for ultra high speed communications. The complexity must be as low as possible in order to provide an efficient implementation. Some MCS already used in high speed wire communications can be used in terahertz wireless communications like BPSK or OOK.

Line coding, known in wire communications, can be implemented in order to shape the spectrum. Coding technics can be used such as 8B10B (see document Widmer et al., "*A DC-Balanced, Partitioned-Block, 8B/10B Transmission Code*", IBM Journal of Research and development, vol. 27, No. 5, September 1983, pp. 440-451.), 64B66B (see document Hajduczenia, "*64b/66b line code*", proposal for 10 Gigabit Ethernet, IEEE 802.3), MB810 (see document Young Kim et al., "*White paper on the MB810 Line Code for 10 GbE*", proposal for 10 Gigabit Ethernet (IEEE 802.3) and document US2005/0012646). These techniques are implemented in PCI express, Gigabit Ethernet, DVI, HDMI and many other standards.

A line code is implemented in order to shape the spectrum for the communication medium. For example, the 8B10B line coding is used to remove the DC components so that the spectrum of the bitstream has no power at the null frequency. A DC free bitsream is desirable since the null frequency is generally filtered by the decoupling capacitors that are used between the different stages of the transceivers (filters, amplifiers . . . etc.).

Document Widmer et al., "*A DC-Balanced, Partitioned-Block, 8B/10B Transmission Code*", IBM Journal of Research and development, vol. 27, No. 5, September 1983, pp. 440-451, discloses a DC free coding scheme, called 8B10B, wherein each 8 bits are coded into 10 bits and a status information obtained from the previous encoding. The idea is to balance continuously between the ones and the zeros so that at each time, the encoded bitstream has exactly the same number of ones as the number of zeros so that the bitstream may be DC free. The DC free encoding modifies the inputted bitstream into an output bitstream having a bounded digital sum variation. The digital sum variation (DSV) is computed from the running digital sum (RDS) as follows (after modulating the bitstream with 1 and −1):

$$RDS = \sum_{n=I}^{J} y_n$$

The digital sum variation is computed with the following formula:

$$DSV = \max_{I,J,\{y_n\}} |RDS| = \max_{I,J,\{y_n\}} \left| \sum_{n=I}^{J} y_n \right|$$

For the encoding, the data is divided into blocks of 8 bits (one byte) and inputted to the encoder. Each byte is then divided into two sub-blocks; five first bits and three last bits. The five first bits are encoded by a 5b/6b code to obtain 6 bits. The 5b/6b encoding is based on two tables; a first table contains codewords having more ones than zeros (or the same number of ones and zeros for some codewords in the table) and a second table containing codewords having more zeros than ones (or the same number of ones and zeros for some codewords in the table).

The tables used for the 5b/6b encoding are listed below. In the table "table_5b_6b_RD_plus", codewords have a number of zeros at least equal to the number of ones. And in the table "table_5b_6b_RD_minus", codewords have a number of ones at least equal to the number of zeros.

$$\text{table\_5b\_6b\_RD\_plus} = \begin{bmatrix} 011000; 100010; 010010; 110001; \\ 001010; 101001; 011001; 000111; \\ 000110; 100101; 010101; 110100; \\ 001101; 101100; 011100; 101000; \\ 100100; 100011; 010011; 110010; \\ 001011; 101010; 011010; 000101; \\ 001100; 100110; 010110; 001001; \\ 001110; 010001; 100001; 010100 \end{bmatrix};$$

$$\text{table\_5b\_6b\_RD\_minus} = \begin{bmatrix} 100111; 011101; 101101; 110001; \\ 110101; 101001; 011001; 111000; \\ 111001; 100101; 010101; 110100; \\ 001101; 101100; 011100; 010111; \\ 011011; 100011; 010011; 110010; \\ 001011; 101010; 011010; 111010; \\ 110011; 100110; 010110; 110110; \\ 001110; 101110; 011110; 101011 \end{bmatrix};$$

As for the 5b/6b encoding, the tables used for the 3b/64 encoding are listed below. In the table "table_3b_4b_RD_plus", codewords have a number of zeros at least equal to the number of ones. In the table "table_3b_4b_RD_minus", codewords have a number of ones at least equal to the number of zeros.

$$\text{table\_3b\_4b\_RD\_plus} = \begin{bmatrix} 0100; 1001; 0101; 0011; 0010; \\ 1010; 0110; 0001; 1000 \end{bmatrix};$$

$$\text{table\_3b\_4b\_RD\_minus} = \begin{bmatrix} 1011; 1001; 0101; 1100; 1101; \\ 1010; 0110; 1110; 0111 \end{bmatrix};$$

For example the encoded version of the following byte: 0 0 0 0 1 0 0 1 would be:

0 1 1 0 0 0 1 0 1 1 when the initial running disparity is equal to +1;

1 0 0 1 1 1 0 1 0 0 when the initial running disparity is equal to −1.

If the running disparity (i.e. the number of ones minus the number of zeros for each encoded 6 bits or 4 bits at the output of resp. the 5b/6b and 3b/4b encoders) is equal to +1, the byte to be encoded (i.e. 0 0 0 0 1 0 0 1) is divided into two parts: five first bits (i.e. 0 0 0 0 1) and three last bits (i.e. 0 0 1). The running disparity being equal to +1 then the 5b/6b encodes the five first bits with: 0 1 1 0 0 0 (since 0 0 0 0 1 corresponds to 1 in decimal so the first word in the table is selected as 5b/6b codeword). Hence, the new running disparity is equal to: +1+(2−4)=−1 ("+1" represents the previous/initial running disparity and "(2−4)" is the running disparity of the encoded word "0 1 1 0 0 0"). The updated running disparity being equal to −1, the table table_3b_4b_RD_minus is used for the 3b/4b encoding. The output is equal to: 1 0 1 1. For each byte to be encoded two codewords are possible (positive or negative running disparity).

In documents Young Kim et al., "*White paper on the MB810 Line Code for 10 GbE*", proposal for 10 Gigabit Ethernet (IEEE 802.3), and US2005/0012646 a new line coding scheme is described that provides a spectrum having null power at the null frequency and a null power at the Nyquist frequency hence a DC free Nyquist free line code. A code parameter called running alternate sum is considered to construct such a code:

$$RAS = \sum_{n=I}^{J} (-1)^n y_n$$

where I and J are integers.

"RAS" is the sum of the coded output symbols within an arbitrary interval between t=IT and t=JT, with alternating polarity. As for the Running Digital Sum, a parameter named Alternative Sum Variation is computed by the following equation:

$$ASV = \max_{I,J,\{y_n\}} |RAS| = \max_{I,J,\{y_n\}} \left| \sum_{n=I}^{J} (-1)^n y_n \right|$$

If the ASV is finite then the bitstream $y_n$ has a spectral null at the Nyquist frequency.

For example, the RDS computation for the binary sequence "1100", gives:

RDS=1+1−1−1=0, and the RAS is:

RAS=−1+1+1−1=0

The RDS and the RAS of the above binary sequence are null. In addition, shifting this binary sequence, as explained below, provides same values for RAS and RDS:

"1001"=>RDS=1−1−1+1=0

RAS=−1−1+1+1=0

"0011"=>RDS=−1−1+1+1=0

RAS=+1−1−1+1=0

"0110"=>RDS=−1+1+1−1=0

RAS=+1+1−1−1=0

The line code MB24 has the following codebook {1100, 1001,0011,0110}. The MB24 is then a DC free Nyquist free line code. The MB24 encoding is explained in Table 1 below:

TABLE 1

MB24 encoding table

| Uncoded word | Codeword |
|---|---|
| 00 | 1001 |
| 01 | 0011 |
| 10 | 1100 |
| 11 | 0110 |

Decoding the MB24 is straightforward. Indeed, one can see from the above table that the two bits in the middle of each codeword corresponds to the uncoded word. The decoder architecture is very simple.

Similar construction can be carried out in order to design the MB12 and the MB34 line codes. The tables 2 and 3 illustrate the encoding process for both codes.

TABLE 2

MB12 encoding table

| State | Input | Output | Next state |
|---|---|---|---|
| S1 | 0 | 11 | S4 |
| S1 | 1 | 01 | S2 |
| S2 | 0 | 11 | S3 |
| S2 | 1 | 10 | S1 |
| S3 | 0 | 00 | S2 |
| S3 | 1 | 10 | S4 |
| S4 | 0 | 00 | S1 |
| S4 | 1 | 01 | S3 |

The MB12 encoder is initialized into the state S1 and then according to the input bit and the table above two output bits are selected and the current state of the encoder is updated.

TABLE 3

MB34 encoding table

| State | Input | Output | Next state |
|---|---|---|---|
| S1 | 000 | 0011 | S1 |
| S1 | 001 | 0110 | S1 |
| S1 | 010 | 1001 | S1 |
| S1 | 011 | 1100 | S1 |
| S1 | 100 | 1011 | S2 |
| S1 | 101 | 1111 | S3 |
| S1 | 110 | 1101 | S4 |
| S1 | 111 | 0111 | S4 |
| S2 | 000 | 0011 | S2 |
| S2 | 001 | 0110 | S2 |
| S2 | 010 | 1001 | S2 |
| S2 | 011 | 1100 | S2 |
| S2 | 100 | 0001 | S1 |
| S2 | 101 | 0100 | S1 |
| S2 | 110 | 1101 | S3 |
| S2 | 111 | 0101 | S4 |
| S3 | 000 | 0011 | S3 |
| S3 | 001 | 0110 | S3 |
| S3 | 010 | 1001 | S3 |
| S3 | 011 | 1100 | S3 |
| S3 | 100 | 0000 | S1 |
| S3 | 101 | 0010 | S2 |
| S3 | 110 | 1000 | S2 |
| S3 | 111 | 0100 | S4 |
| S4 | 000 | 0011 | S4 |
| S4 | 001 | 0110 | S4 |
| S4 | 010 | 1001 | S4 |
| S4 | 011 | 1100 | S4 |
| S4 | 100 | 0010 | S1 |
| S4 | 101 | 1010 | S2 |
| S4 | 110 | 1110 | S3 |
| S4 | 111 | 1011 | S3 |

As for the MB12, The MB34 encoder is initialized into the state S1 and then according to three input bits and the table above four output bits are selected and the current state of the encoder is updated.

An example of the MB810 is illustrated and deeply discussed in document B. Sklar, "Digital Communications: Fundamentals and Applications", Prentice Hall 2001, ISBN: 0-13-084788-7.

However, there is a need for improvement of the shaping of bitstream spectra in order to match a channel transfer function.

SUMMARY OF THE INVENTION

According to a first aspect of one or more embodiments discussed herein, there is provided a signal processing method, the method including: performing a plurality of line coding steps on respective parts of an input bitstream to obtain a plurality of respective line-coded signals, and multiplexing the plurality of line-coded signals to obtain a spectrum-shaped output signal.

A method according to the first aspect provides a modulation scheme that makes it possible to shape the spectrum of a bitstream to be transmitted in order to match a channel transfer function of a communication medium (for example a wireless communication medium).

For DC free communications, a DC free line coding scheme may be used in order to suppress the DC component that could not be carried through the communication channel and/or in the transceivers. The DC free line coding may maintain an RDS value (Running Digital Sum) to a bounded value and uses some known techniques like 8B10B, 64B66B, MB810 as already implemented in some standards (PCI express, Gigabit Ethernet, DVI, HDMI, etc.).

In particular, a minimum bandwidth line coding may be used for constructing a line code having some nulls for some frequencies in the spectrum. Thus, the in a flexible manner, the spectrum could be modified by adjusting/modifying the way that the code is constructed. The minimum bandwidth line code may be based on a DC free-Nyquist free line code. Such code satisfies the RDS constraint to provide a DC free bitstream and satisfies also the RAS (Running Alternate Sum) to provide a Nyquist free bitstream.

Methods according to the first aspect make it possible to improve the bit error rate performance.

Also, the implementation is not complex and compatible with high speed architectures (e.g. parallel implementations).

The spectrum of the bitstream can be shaped without applying any filtering before the transmission over the communication medium.

For example, the multiplexing comprises interleaving bits from the plurality of line-coded signals.

According to embodiments, bits from respective data blocks of the plurality of line-coded signals are interleaved.

For example, the bits are interleaved by groups of N bits, N being an integer superior or equal to 1.

The method may further comprise subdividing the input bitstream into the parts.

For example, the input stream is subdivided according to a round Robin algorithm.

According to embodiments, the coding steps are performed according to a minimum bandwidth line code.

For example, the line-coded signals have respective null power spectra at the null frequency.

According to embodiments, the line-coded signals have respective null power spectra at the Nyquist frequency.

The method may further comprise transmitting an information representative of the identification of the respective parts coded during the respective coding steps.

For example, the method further comprises transmitting an information representative of the identification of the coding scheme used for coding the respective parts.

The method may further comprise determining a transfer function of a communication channel through which the spectrum-shaped output signal is to be transmitted, and wherein the coding steps are performed according to the transfer function.

For example, the transfer function is determined before performing the coding steps.

For example, the transfer function is dynamically updated according to a number of errors detected.

According to embodiments the coding steps are performed in parallel.

The method may further comprise selecting a coding scheme for the coding steps according to a number of errors detected.

According to a second aspect of one or more embodiments discussed herein, there is provided a signal processing method, the method including: receiving a spectrum shaped signal representing an original signal and comprising a plurality of multiplexed line-coded signals, decoding the line-coded signals, and arranging the decoded line-coded signals as parts of the original signal to obtain the original signal.

For example, the spectrum shaped signal comprises interleaved bits from the plurality of line-coded signals.

According to embodiments, the interleaved bits of the spectrum shaped signal originate from respective data blocks of the plurality of line-coded signals.

For example, the interleaved bits are interleaved by groups of N bits, N being an integer superior or equal to 1.

According to embodiments, the line-coded signals are encoded according to a subdivision of the original signal.

For example, the line-coded signals are encoded according to a round Robin subdivision of the original signal.

According to embodiments, the line-coded signals are coded according to a minimum bandwidth line code.

For example, the line-coded signals have respective null power spectra at the null frequency.

According to embodiments, the line-coded signals have respective null power spectra at the Nyquist frequency.

The method may further comprise receiving an information representative of the identification of the respective parts of the original signal.

The method may further comprise receiving an information representative of the identification of the coding scheme used for coding the respective line-coded signals.

According to a third aspect of one or more embodiments discussed herein, there are provided computer programs and computer program products comprising instructions for implementing methods according to the first, and/or second aspect(s), when loaded and executed on computer means of a programmable apparatus.

According to a fourth aspect of one or more embodiments discussed herein, there is provided a device configured for implementing methods according to the first aspect.

According to a fifth aspect of one or more embodiments discussed herein, there is provided a device configured for implementing methods according to the second aspect.

According to a sixth aspect of one or more embodiments discussed herein, there is provided a system comprising devices according to the fourth and fifths aspects.

BRIEF DESCRIPTION OF THE DRAWINGS

Other features and advantages will become apparent from the following description of non-limiting exemplary embodiments, with reference to the appended drawings, in which:

FIG. 1a schematically illustrates an encoder according to embodiments;

FIG. 1b illustrates the power spectrum of the bitstream encoded by the encoder of FIG. 1a;

FIG. 3b illustrates the power spectrum at the output the bipolar modulation of the bitstream encoded by the encoder of FIG. 3a;

FIG. 4b illustrates the power spectrum at the output of the bipolar modulation of the bitstream encoded by the encoder of FIG. 4a;

FIG. 5a illustrates an encoder according to embodiments with four parallel MBXY encoders;

FIG. 5b illustrates the power spectrum at the output of the bipolar modulation of the bitstream encoded by the encoder of FIG. 5a;

DETAILED DESCRIPTION OF THE INVENTION

Figure 2:
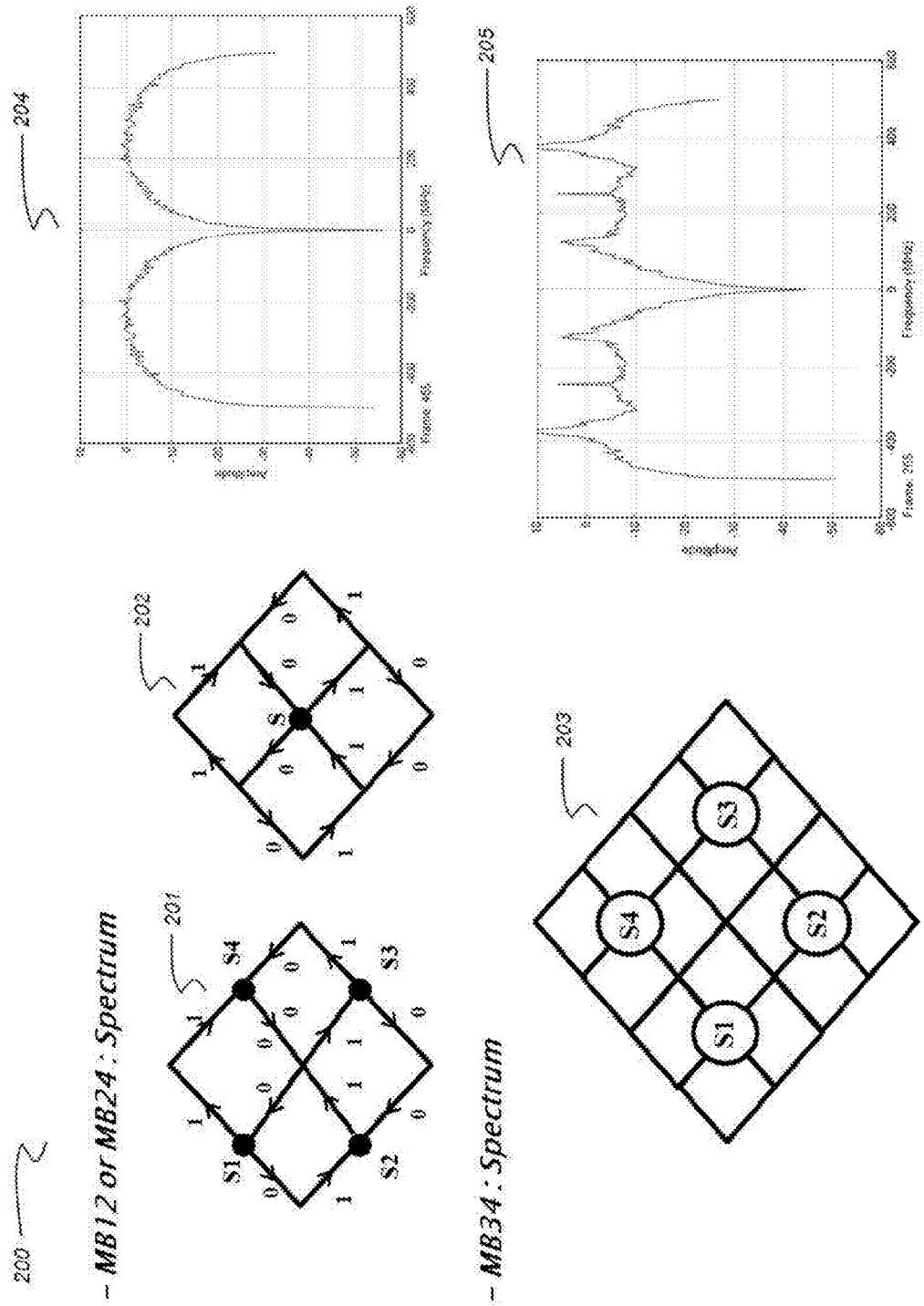
FIG. 2 schematically illustrates the minimum bandwidth codes MB12, MB24 and MB34 with their respective power spectra.

Detailed descriptions of the embodiments are discussed herein below.

FIG. 1a shows an architecture for an encoder 100 comprising a Forward Error Correction module 101 and an MBXY encoder module 102.

The Forward Error Correction can use any type of code. For example, in case a Convolutional code is used, a table containing some possible convolutional codes with the optimum constraint length having coding rates equal to ½ and ⅓ is available in document *B. Sklar*, "Digital Communications: Fundamentals and Applications", Prentice Hall 2001, ISBN: 0-13-084788-7. Any codes listed in table 7.4 of this document can be used.

Document Sklar, "*Digital Communications: Fundamentals and Applications*", Prentice Hall 2001, ISBN: 0-13-084788-7, gives some FEC examples: BCH, Reed-Solomon, Turbo Codes, LDPC (Low Density Parity Check Code), etc. All these codes can be used as Forward Error Correction codes.

The encoder 100 further comprises a bipolar modulation module 103 configured to convert the bits into positive or negative integers ("+1" and "−1"). The bit "0" is coded with "+1" and the bit "1" is coded with "−1".

FIG. 1b shows a curve 104 representing the power spectrum of the modulated bitstream output from encoder 100. The spectrum has a null power at the null frequency.

FIG. 2 is a "BUDA" graphical representation of the MB12, MB24 and the MB34 codes (BUDA is the acronym for "*Basic Code Design Building Block*"). The tables of these codes are presented in Table 1, Table 2 and Table 3.

The BUDA cell 201 of the MB12 code comprises four points representing each possible state of the encoder (S1, S2, S3, S4). In the cell, the right-arrowed branches correspond to a bit equal to 1 and the left-arrowed branches correspond to a bit equal to 0. Each transition corresponds to 2 bits (encoded bits).

The BUDA cell 202 of the MB24 code comprises one state (State S) and each transition corresponds to 4 bits (encoded bits).

The power spectrum of the MB12 and MB24 codes is shown in graph 204.

The BUDA cell 203 of the MB34 code comprises four states (S1, S2, S3, S4) and 8 possible paths for passing from one state to another. Each path contains 4 branches corresponding to the 4 output bits.

The power spectrum of the MB34 code is shown in graph 205.

Figure 3A:
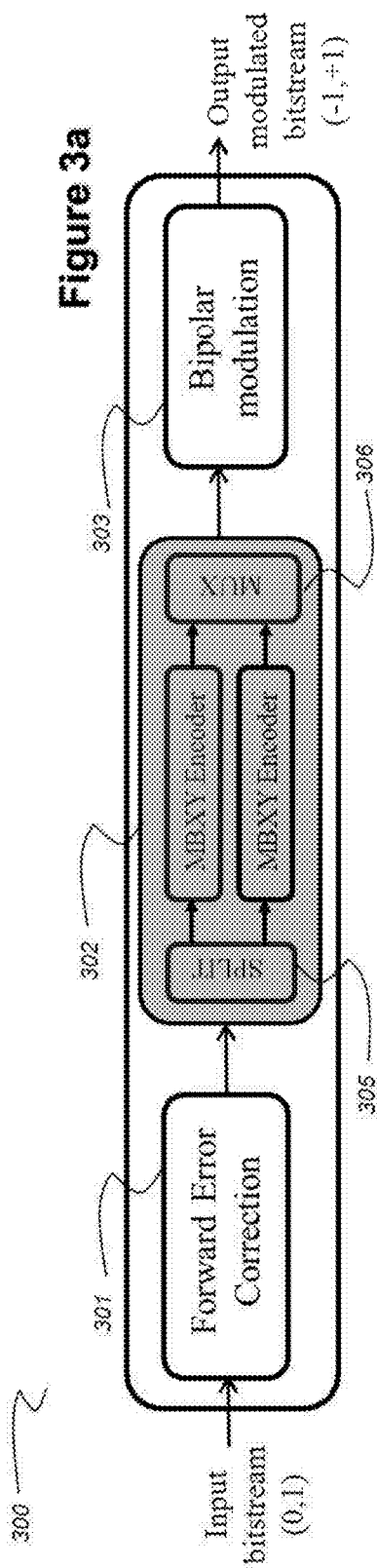
FIG. 3a schematically illustrates an encoder according to embodiments with two parallel MBXY encoders.

FIG. 3a shows an encoder 300 comprising a Forward Error Correction module 301 and a line coding module 302 with two parallel minimum bandwidth line encoders. The line encoding module 302 comprises a splitting module 305 for applying a round robin algorithm in order to present the bits having even indices to a first MBXY encoder and the bits having odd indices to a second MBXY encoder.

The MBXY encoders apply any minimum bandwidth line coding like for example: MB12, MB24 or MB34. Other minimum bandwidth encoders could be used (for example the MB810 code, see document US2005/0012646).

The line encoding module 302 further comprises a multiplexer 306 configured to combine the two bitstreams encoded by the MBXY encoders.

The bitstream outputted from the multiplexer is fed to a bipolar modulation module 303 configured to apply a bipolar modulation (and thus output a stream with +1 and −1 values) to the bits having even indices from the first MBXY encoder and the bits having odd indices from the second MBXY encoder.

Figure 3B:
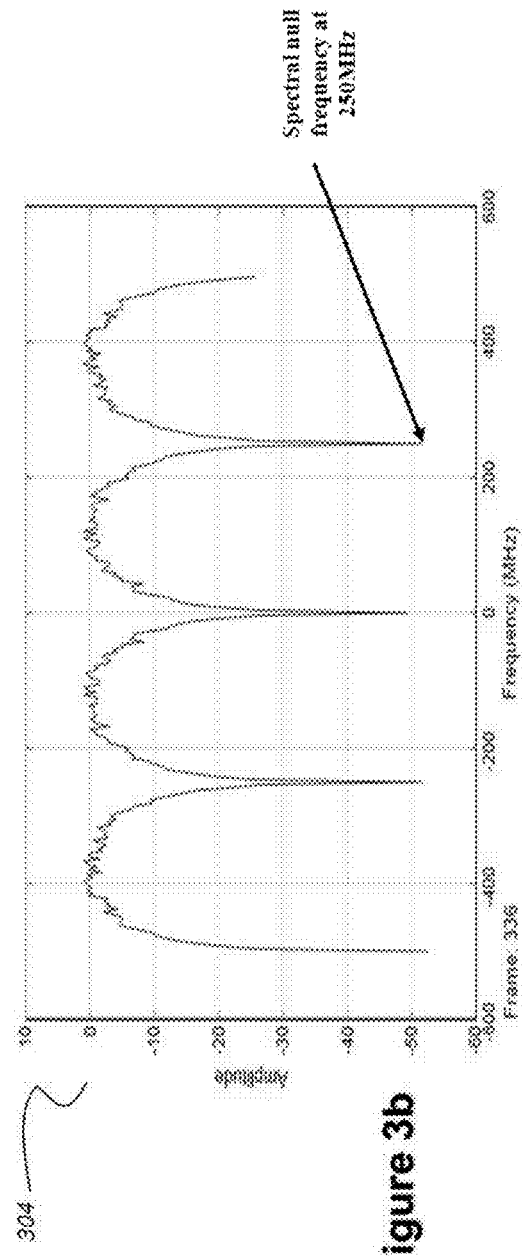

FIG. 3b shows a curve 304 representing the power spectrum of the modulated bitstream output from encoder 300. The spectrum has a null power at the null frequency, at the Nyquist frequency (B/2) and at the frequency B/4. This can be proved as follows.

Let $\{x_k\}$ be the output modulated stream (+1 and −1 values) and Y(f) be the Fourier transform of the X(t); where X(t) is given by: $X(t)=\Sigma_{k=-\infty}^{+\infty} x_k \delta(t-K/B)$, with B is equal to T which the sampling period.

The Fourier transform of X(t) is then given by $Y(f)=\Sigma_{k=-\infty}^{+\infty} x_k e^{-jk2\pi f/B}$.

With the above equation, the value of the spectrum at the frequency B/4 can be computed as follows:

$$Y(B/4) = \sum_{k=-\infty}^{+\infty} x_k e^{-jk2\pi\left(\frac{B}{4}\right)/B} = \sum_{k=-\infty}^{+\infty} x_k e^{-jk\pi/2}$$

By grouping the even indices and the odd indices, we have:

$$Y(B/4) = \sum_{i=-\infty}^{+\infty} x_{2i} e^{-j(2i)\pi/2} + \sum_{i=-\infty}^{+\infty} x_{2i+1} e^{-j(2i+1)\pi/2}$$

$$Y(B/4) = \sum_{i=-\infty}^{+\infty} x_{2i}(-1)^i + e^{-j\pi/2} \sum_{i=-\infty}^{+\infty} x_{2i+1}(-1)^i$$

The first sum in the equation above is equal to the RAS (acronym for "*Running Alternate Sum*") of the encoded bits obtained from the first MBXY encoder and the second sum in the equation is equal to the RAS of the encoded bits obtained from the second MBXY encoder. Since both the encoders are of minimum bandwidth, the RAS values are equal to zero and the Y(B/4) is equal to zero too. This null value appears in curve 304 (spectrum null frequency at 250 MHz: in this example, B=1 GHz which is the sampling frequency).

Figure 4A:
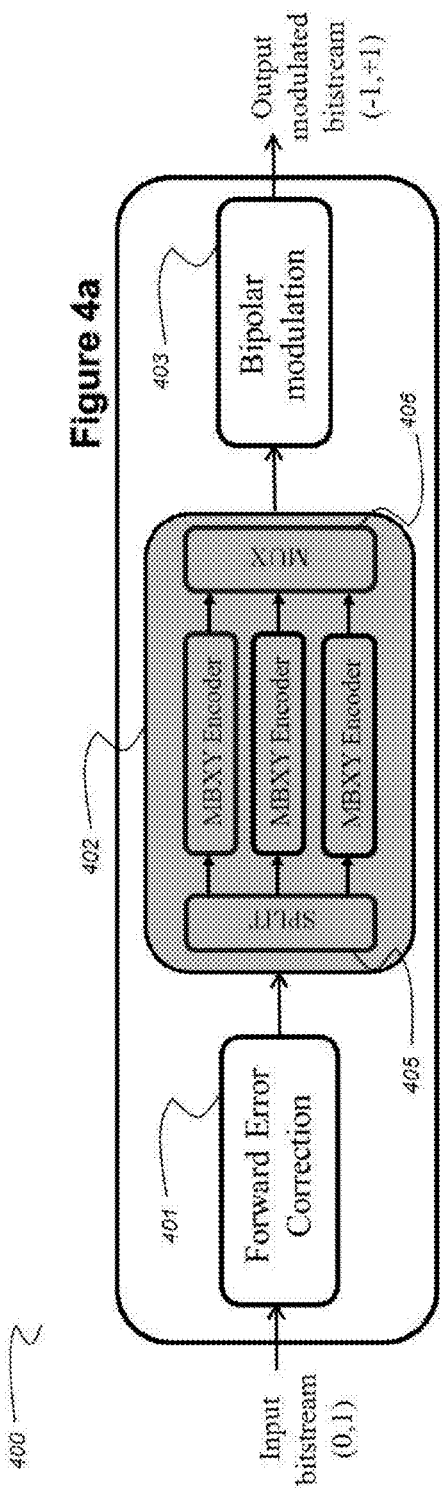
FIG. 4a illustrates an encoder according to embodiments with three parallel MBXY encoders.

FIG. 4a shows an encoder 400 comprising a FEC module 401, and a line coding module 402 with three parallel minimum bandwidth line encoders.

The line coding module 402 comprises a splitting module 405 configured to apply a round robin algorithm in order to present the bits in an alternative way to the first, the second and the third MBXY encoders. The line coding module 402 also comprises a multiplexer 406 configured to output a bitstream with the bits having indices equal to 3.i (with i being a positive integer) coming from the first MBXY encoder, the bits having indices equal to 3.i+1 coming from the second MBXY encoder and the bits having indices equal to 3.i+2 coming from the third MBXY encoder.

The encoder further comprises a bipolar modulation module 403 configured to apply a bipolar modulation (output stream +1 and −1).

Figure 4B:
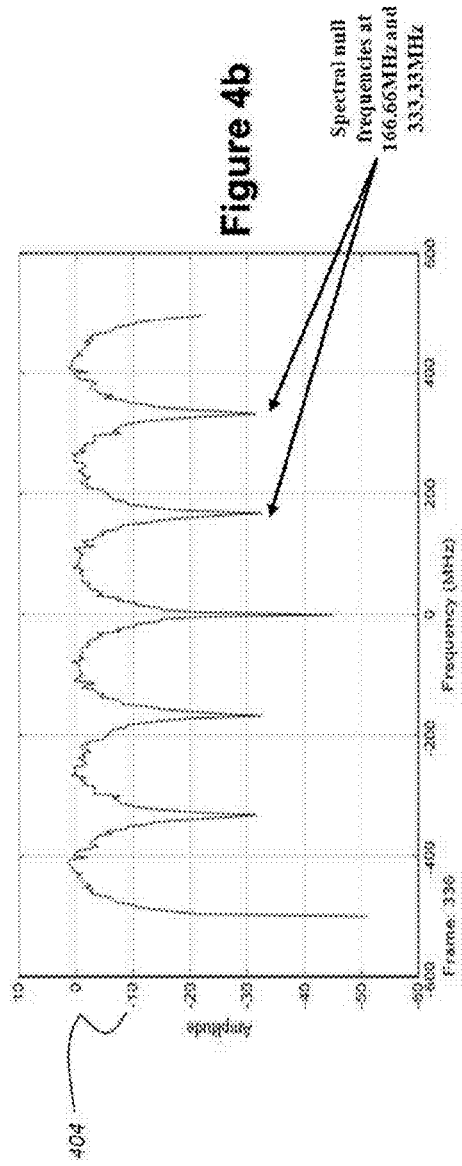

FIG. 4b shows a curve 404 representing the power spectrum of the modulated bitstream output from encoder 400. The power spectrum has null values at (B/2)/3 and 2(B/3)/2 frequencies. This can be proved as follows (the notation being the same as above).

The spectrum value at the frequency (B/6) is:

$$Y(B/6) = \sum_{k=-\infty}^{+\infty} x_k e^{-jk2\pi\left(\frac{B}{6}\right)/B} = \sum_{k=-\infty}^{+\infty} x_k e^{-jk\pi/3}$$

By grouping the indices by computing the modulo 3, we have:

$$Y(B/6) = \sum_{i=-\infty}^{+\infty} x_{3i} e^{-j(3i)\pi/3} + \sum_{i=-\infty}^{+\infty} x_{3i+1} e^{-j(3i+1)\pi/3} + \sum_{i=-\infty}^{+\infty} x_{3i+2} e^{-j(3i+2)\pi/3}$$

$$Y(B/6) = \sum_{i=-\infty}^{+\infty} x_{3i}(-1)^n + \sum_{i=-\infty}^{+\infty} x_{3i+1}(-1)^n e^{-j\pi/3} + \sum_{i=-\infty}^{+\infty} x_{3i+2}(-1)^n e^{-j2\pi/3}$$

$$Y(B/6) = \sum_{i=-\infty}^{+\infty} x_{3i}(-1)^n + e^{-j\pi/3}\sum_{i=-\infty}^{+\infty} x_{3i+1}(-1)^n + e^{-j2\pi/3}\sum_{i=-\infty}^{+\infty} x_{3i+1}(-1)^n$$

The first sum in the equation above is equal to the RAS ("*Running Alternate Sum*") of the encoded bits obtained from the first MBXY encoder, the second sum in the equation is equal to the RAS of the encoded bits obtained from the second MBXY encoder and the third sum in the equation is equal to the RAS of the encoded bits obtained from the third MBXY encoder. Since all of the encoders are of minimum bandwidth, the RAS values are equal to zero and the Y(B/6) is equal to zero too. This null value appears in curve 404 (spectrum null frequency at 166.66 MHz: in this example B=1 GHz which is the sampling frequency).

The same proof could be given for the spectrum value at the frequency (2B/6). This corresponds at the frequency 333.33 MHz in curve 404.

FIG. 5a shows an encoder 500 comprising a FEC module and a line coding module 502 with four parallel minimum bandwidth line encoders.

The line coding module comprises a splitting module 505 configured to apply a round robin algorithm in order to present the bits in an alternative way to the first, the second, the third and the fourth MBXY encoders. The line coding module further comprises a multiplexer 506 configured to output a bitstream where with the bits having indices equal to 4.i (with i being a positive integer) coming from the first MBXY encoder, the bits having indices equal to 4.i+1 coming from the second MBXY encoder, the bits having indices equal to 4.i+2 coming from the third MBXY encoder and the bits having indices equal to 4.i+3 coming from the fourth MBXY encoder.

The encoder further comprises a bipolar modulation module 503 configured to apply a bipolar modulation and output a stream with +1 and −1 value.

FIG. 5b shows a curve 504 representing the power spectrum of the modulated bitstream output from encoder 500. The power spectrum has null values at the (B/2)/4, 2(B/2)/4, 3(B/2)/4 frequencies (125 MHz, 250 MHz and 375 MHz in curve 504).

This can be proven as described hereinabove with reference to FIGS. 3a, 3b, 4a and 4b.

Figure 6:
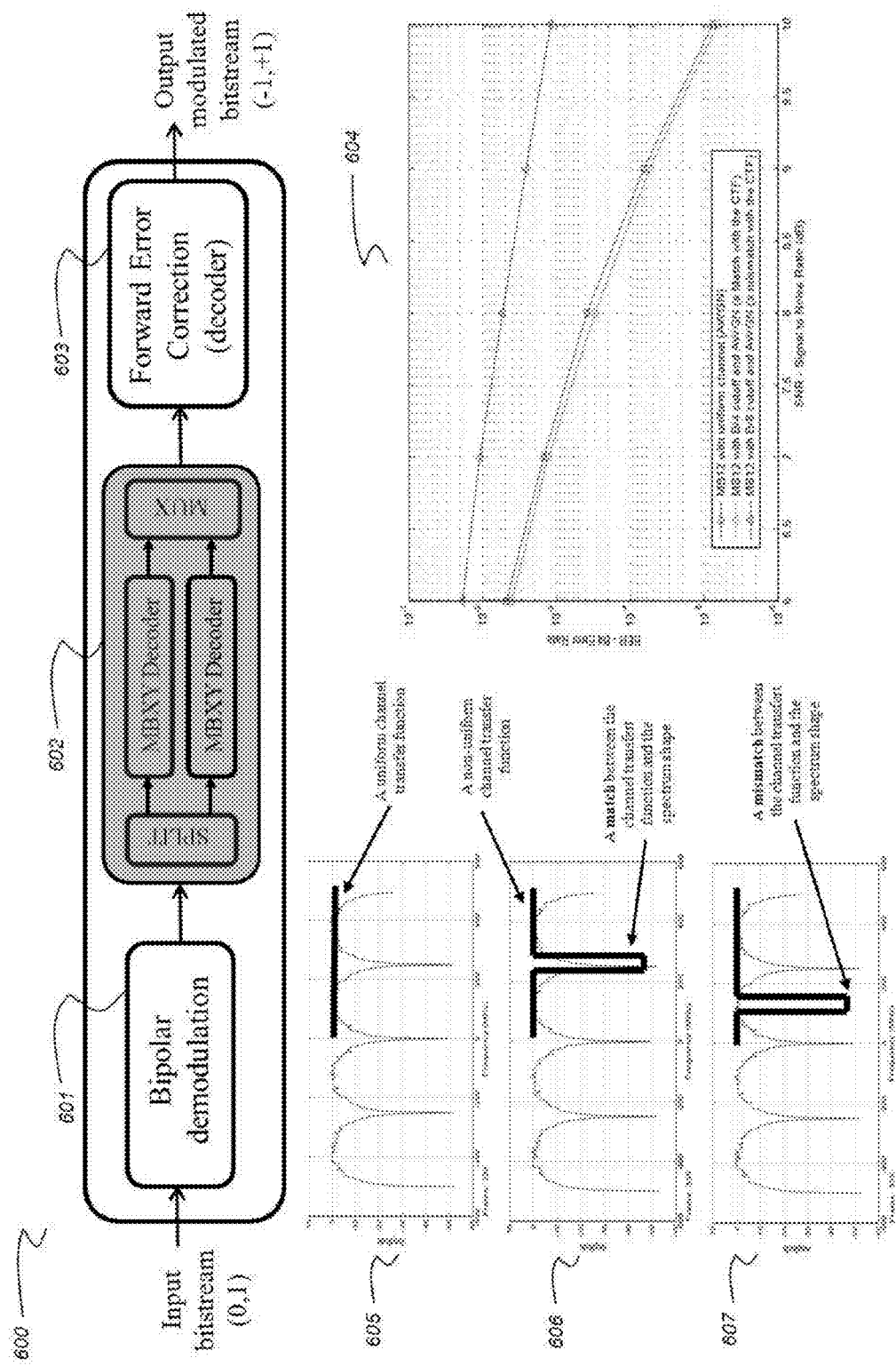
FIG. 6 shows simulation results with the Bit Error Rate parameter computed for different channel transfer functions.

FIG. 6 shows simulation results giving the bit error rate performances 605, 606 and 607 for three channels. The encoder 602 used for the simulation has a bipolar demodulation module 601, a Forward Error Correction decoder 603 and a line coding module 602 (including a splitting module, two MBXY decoders and a multiplexer).

The channel transfer function 605 is uniform. In graph 604, the curve with squares represents the bit error rate simulated when a uniform channel is used with an Additive White Gaussian Noise channel.

The channel transfer function 606 is non-uniform and has a strong attenuation at frequency B/4=250 MHz. This frequency is not available in the spectrum of the encoded bitstream (i.e. the power spectrum of B/4 is null). In graph 604, the curve with circles represents the bit error rate simulated when a non-uniform channel is used with an Additive White Gaussian Noise channel. This curve is almost the same as the curve obtained when using a uniform channel. It means that no frequency is lost in the communication and all the frequency components are received.

The channel transfer function is non-uniform and has a strong attenuation at frequency B/8=125 MHz. This frequency is available in the spectrum of the encoded bitstream and hence the BER gets poor since some components around this frequency are destroyed/filtered and a part of the information is lost. In graph 604, the curve with triangles shows the BER.

Figure 7:
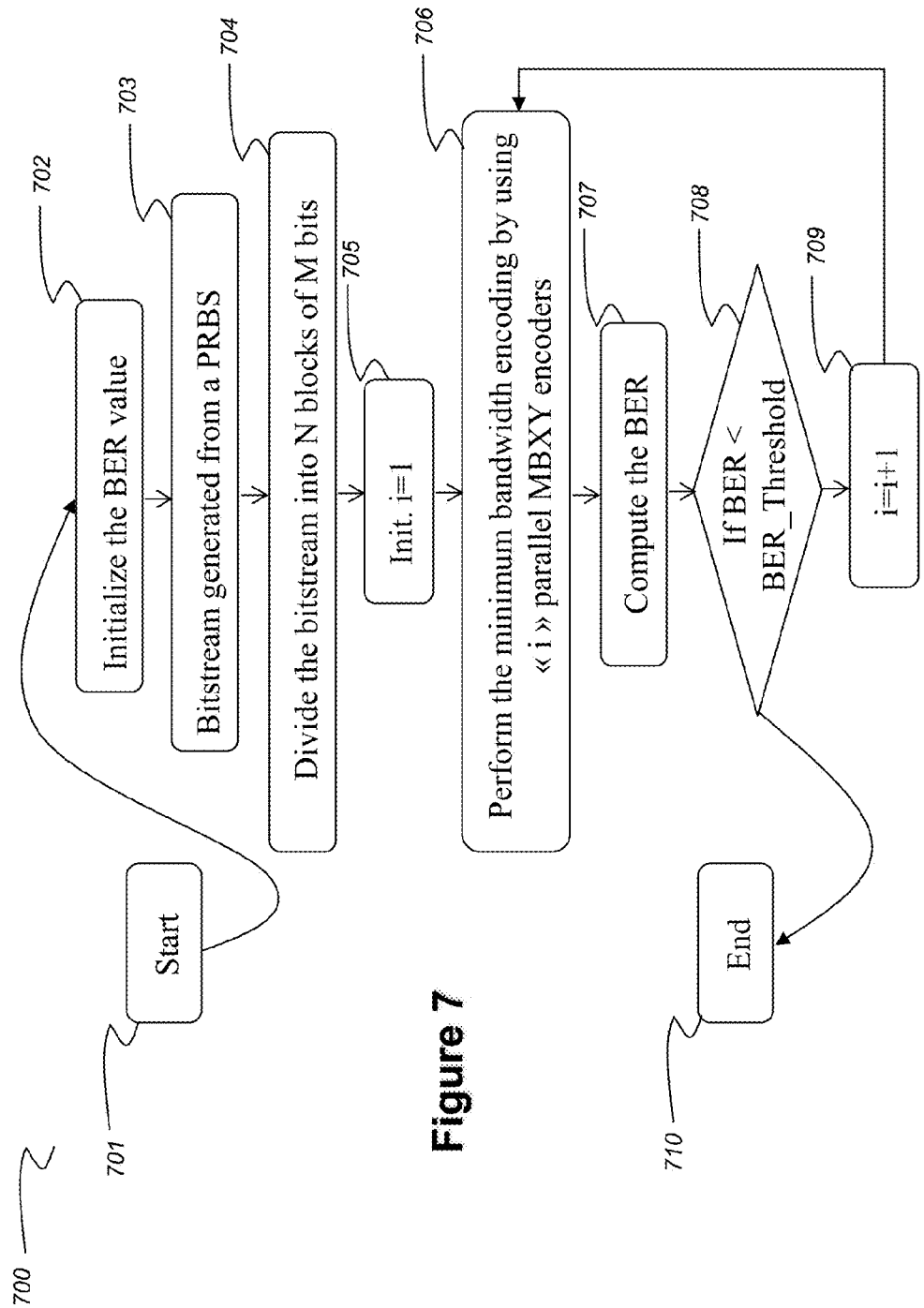
FIG. 7 is a flowchart of steps for selecting the appropriate number of parallel minimum bandwidth encoders based on a bit error rate according to embodiments.

In order to select the appropriate parallel minimum bandwidth line encoder according to a measure of the bit error rate, an algorithm 700 as described with reference to FIG. 7 can be carried out.

After an initialization step 701, the Bit Error rate is set to an initial value during step 702.

Next, a bitstream is generated during step 703 from a pseudo random binary sequence (PRBS) generator (702). The bitstream is then divided into several blocks of a certain number of bits during step 704. A first line encoder is used (one minimum bandwidth line encoder; i.e. MBXY) in order to encode the data bits (steps 705 and 706; where i=1).

A decoder at the receiver estimates the BER during step 707, by applying a bit to bit comparison between the received bitstream and the bitstream of the PRBS which is known by the receiver. The measured BER is then compared with a predefined threshold value (BER_THRESHOLD) during step 708. If the BER is less than the BER_THRESHOLD value, this first line encoder is used (i.e. one minimum bandwidth line encoder; i.e. MBXY). Otherwise, the transmitter selects a line encoder having two parallel minimum bandwidth encoders (step 709 where i=2).

The same process is applied until the appropriate number "i" equal the number of parallel minimum bandwidth encoders used in the line coding block is determined. Thus, many trials are performed and after each trial, the number of parallel minimum bandwidth line encoders is increased until a line encoder having null powers in some frequencies attenuated/filtered by the channel is obtained.

Figure 8:
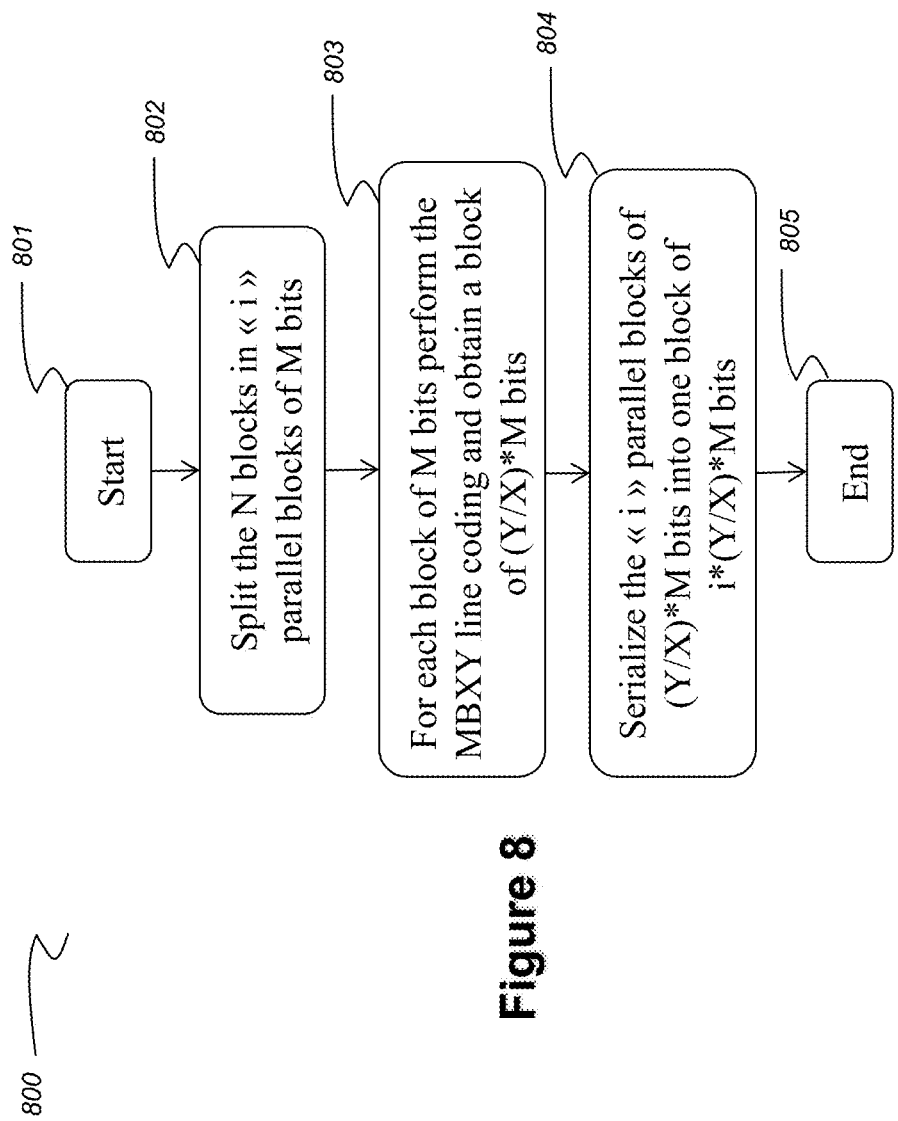
FIG. 8 is a flowchart of steps of a minimum bandwidth encoding according to embodiments.

With reference to FIG. 8, the parallel minimum bandwidth line encoding 800 is described.

After an initialization step 801, the uncoded bitstream is split, during step 802, into a number of parallel blocks of M bits. Each block of M bits is encoded with an MBXY encoder during step 803. Next, during step 804, the bits (i parallel blocks of (Y/X)*M bits) obtained from the output of the parallel minimum bandwidth encoders are combined.

Figure 9:
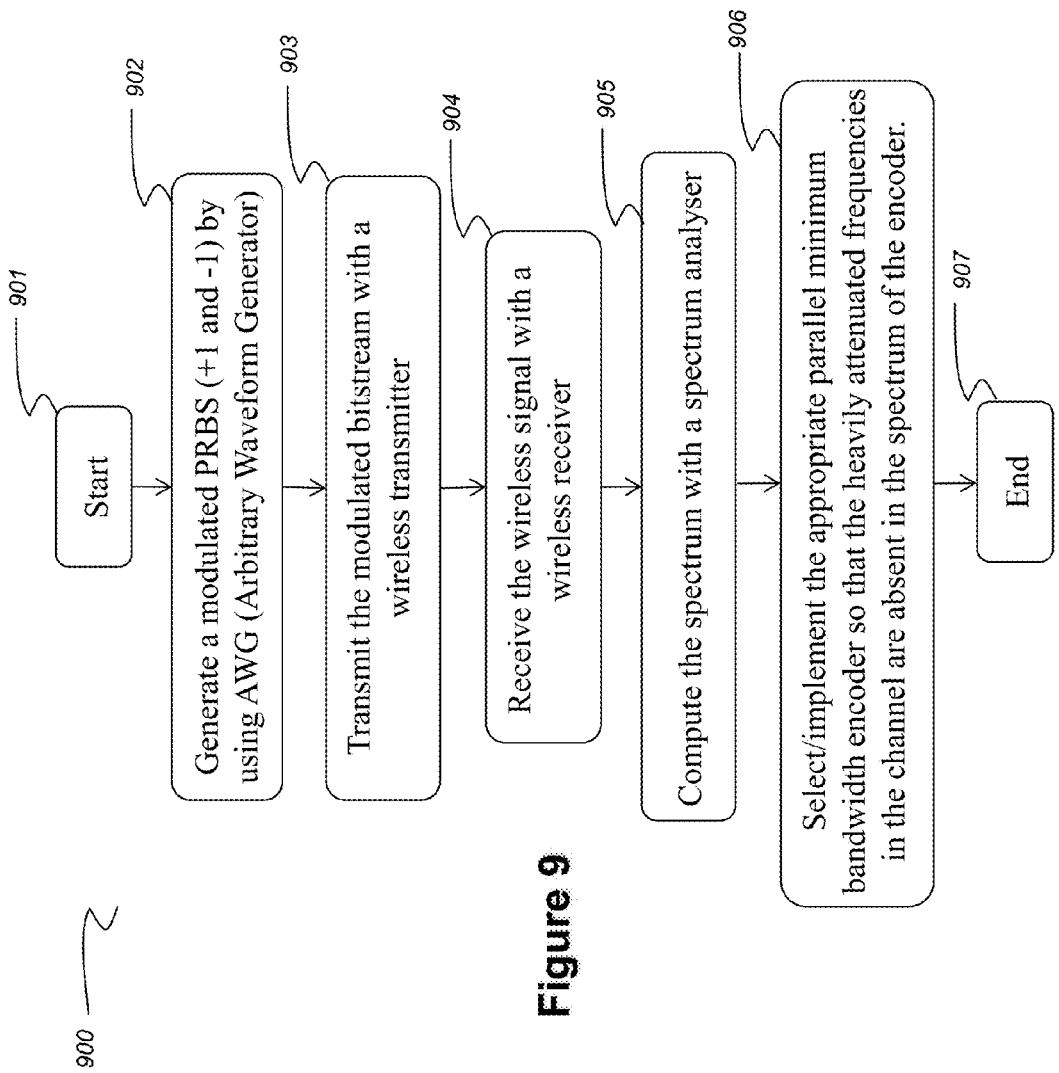
FIG. 9 is a flowchart of steps for selecting the appropriate number of parallel minimum bandwidth encoders based on a power spectrum measurement according to embodiments.

Another algorithm 900 that can be used in order to select the appropriate parallel minimum bandwidth line encoder is described with reference to FIG. 9.

The channel transfer function is measured using by laboratory equipment (for example an Arbitrary Waveform Generator (AWG) and a spectral analyzer). A modulated PRBS is generated by the AWG during step 902 after an initialization step 901.

The modulated bitstream is sent to the wireless transmitter during step 903 and is received during step 904.

A spectrum analyzer computes and displays the power spectrum of the received signal during step 905. Starting from the power spectrum, it can be observed that the frequencies are heavily attenuated by the wireless channel. The number of parallel minimum bandwidth encoders that are to be used in the line encoding is determined during step 906, so that a null power in the power spectrum of the encoded bitstream is also null in the power spectrum displayed by the spectrum analyzer.

The process ends with step 907.

Figure 11:
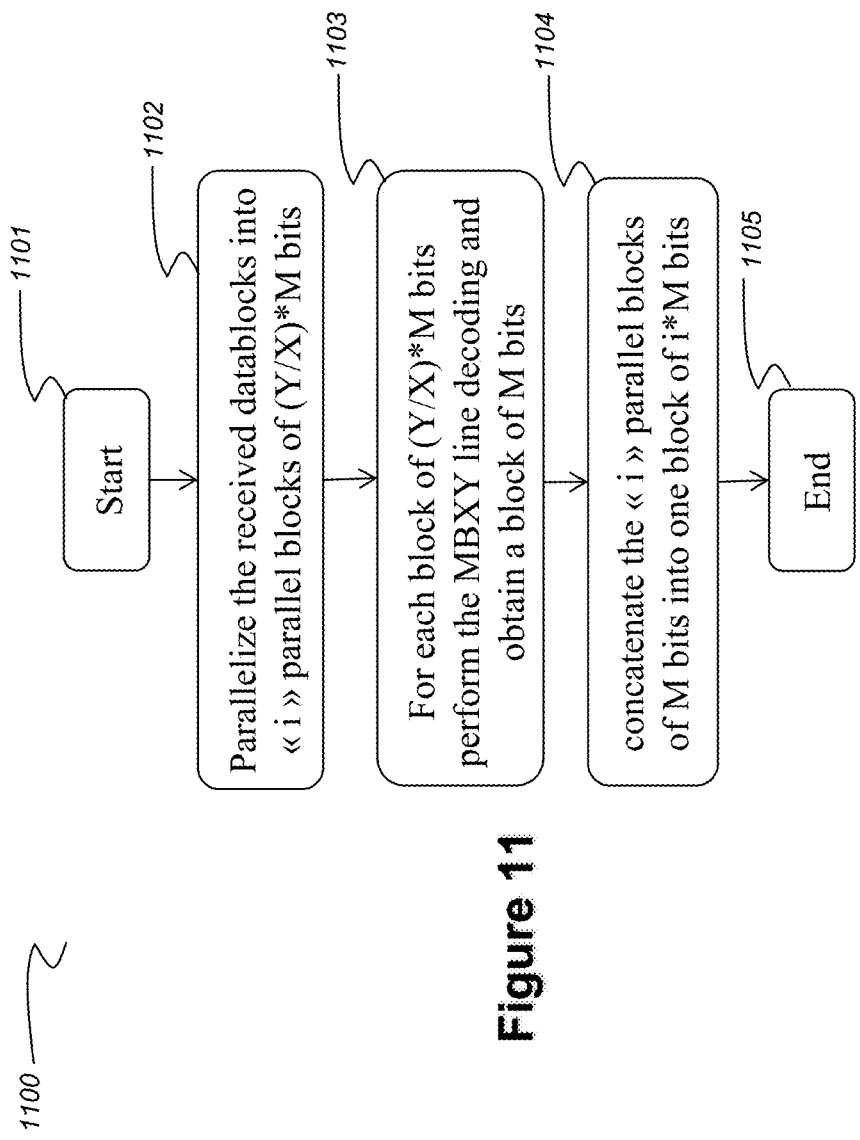
FIG. 11 is a flowchart of steps of a decoding according to embodiments.

With reference to FIG. 11, the parallel minimum bandwidth line decoding 1100 is described.

After an initialization step 1101, the encoded data blocks are received and parallelized according to a number I of parallel blocks, each comprising a number (Y/X)*M bits.

Next, during step 1103, for each block, MBXY line decoding is performed to obtain corresponding blocks of M bits each.

The number i of parallel blocks of M bits obtained are then concatenated during step 1104. The process is then terminated during step 1105.

Figure 10:
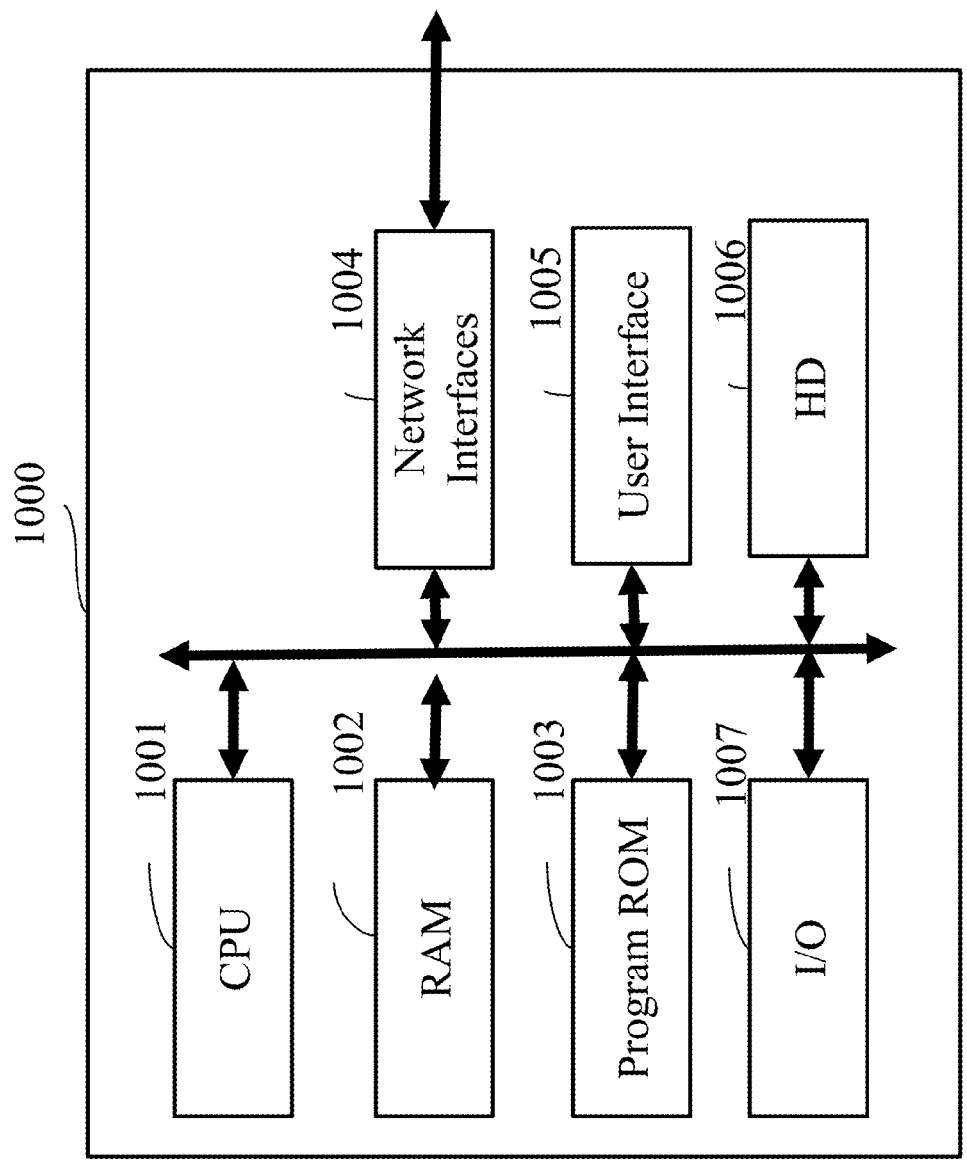
FIG. 10 is a schematic illustration of a general architecture for a device according to embodiments.

FIG. 10 is a schematic illustration of a device according to embodiments. The device comprises a RAM memory 1002 which may be used as a working memory for a control unit 1001 configured for implementing a method according to embodiments. For example, the control unit may be configured to execute instructions of a computer program loaded from a ROM memory 1003. The program may also be loaded from a hard drive 1006. For example, the computer program is designed based on the flowcharts of FIGS. 7, 8 and 9 and the above description.

The device also comprises a network interface 1004 which may be a single network interface, or comprise a set of network interfaces (for instance several wireless interfaces, or several types of wired or wireless interfaces). The device may comprise a user interface 1005 for displaying information to a user and for receiving inputs from the user.

The device may also comprise an input/output module 1007 for receiving and/or sending data from/to external devices.

While embodiments have been illustrated and described in detail in the drawings and foregoing description, such illustration and description are to be considered illustrative or exemplary and not restrictive, the inventions not being restricted to the disclosed embodiment(s). Other variations to the disclosed embodiment(s) can be understood and effected by those skilled in the art in practicing the claimed inventions, from a study of the drawings, the disclosure and the appended claims.

In the claims, the word "comprising" does not exclude other elements or steps, and the indefinite article "a" or "an" does not exclude a plurality. A single processor or other unit may fulfill the functions of several items recited in the claims. The mere fact that different features are recited in mutually different dependent claims does not indicate that a combination of these features cannot be advantageously used. Any reference signs in the claims should not be construed as limiting the scope thereof.

The invention claimed is:

1. A signal processing method, the method comprising:
performing a plurality of line coding steps on respective parts of an input bitstream to obtain a plurality of respective line-coded signals;
multiplexing the plurality of line-coded signals to obtain a spectrum-shaped output signal; and
determining a transfer function of a communication channel through which the spectrum-shaped output signal is to be transmitted,
wherein the plurality of line coding steps are performed according to the transfer function.

2. The method according to claim 1, wherein the multiplexing comprises interleaving bits from the plurality of line-coded signals.

3. The method according to claim 2, wherein bits from respective data blocks of the plurality of line-coded signals are interleaved.

4. The method according to claim 3, wherein the bits are interleaved by groups of N bits, N being an integer greater than or equal to 1.

5. The method according to claim 1, further comprising subdividing the input bitstream into the parts.

6. The method according to claim 1, wherein the coding steps are performed according to a minimum bandwidth line code.

7. The method according to claim 1, wherein the line-coded signals have at least one of:
respective null power spectra at the null frequency, and
respective null power spectra at the Nyquist frequency.

8. The method according to claim 1, further comprising transmitting an information representative of an identification of the respective parts coded during the respective coding steps.

9. The method according to claim 1, further comprising transmitting an information representative of an identification of a coding scheme used for coding the respective parts.

10. The method according to claim 1, further comprising a step of selecting a coding scheme for the coding steps according to a number of errors detected.

11. A signal processing method, the method comprising:
receiving a spectrum shaped signal representing an original signal and comprising a plurality of multiplexed line-coded signals, the spectrum shaped signal being received via a communication channel having a transfer function and line coding steps performed on the line-coded signals are performed according to the transfer function,
decoding the line-coded signals, and
arranging the decoded line-coded signals as parts of the original signal to obtain the original signal.

12. The method according to claim 11, wherein the spectrum shaped signal comprises interleaved bits from the plurality of line-coded signals.

13. The method according to claim 12, wherein the interleaved bits of the spectrum shaped signal originate from respective data blocks of the plurality of line-coded signals.

14. The method according to claim 13, wherein the interleaved bits are interleaved by groups of N bits, N being an integer greater than or equal to 1.

15. The method according to claim 11, wherein the line-coded signals are encoded according to a subdivision of the original signal.

16. The method according to claim 11, wherein the line-coded signals are coded according to a minimum bandwidth line code.

17. The method according to claim 11, wherein the line-coded signals have at least one of:
respective null power spectra at the null frequency, and respective null power spectra at the Nyquist frequency.

18. The method according to claim 11, further comprising receiving an information representative of an identification of the respective parts of the original signal.

19. The method according to claim 11, further comprising receiving an information representative of an identification of the coding scheme used for coding the respective line-coded signals.

20. A signal processing device, the device comprising:
a processing unit configured to perform a plurality of line coding steps on respective parts of an input bitstream to obtain a plurality of respective line-coded signals, to multiplex the plurality of line-coded signals to obtain a spectrum-shaped output signal, and to determine a transfer function of a communication channel through which the spectrum-shaped output signal is to be transmitted,
wherein the plurality of line coding steps are performed according to the transfer function.

21. A signal processing device, the device comprising:
a receiving unit configured to receive a spectrum shaped signal representing an original signal and comprising a plurality of multiplexed line-coded signals, the spectrum shaped signal being received via a communication channel having a transfer function and line coding steps performed on the line-coded signals are performed according to the transfer function, and
a processing unit configured to decode the multiplexed line-coded signals, and to arrange the decoded line-coded signals as parts of the original signal to obtain the original signal.

22. A signal processing system comprising:
a first signal processing device comprising a processing unit configured to perform a plurality of line coding steps on respective parts of an input bitstream to obtain a plurality of respective line-coded signals, to multiplex the plurality of line-coded signals to obtain a spectrum-shaped output signal, and to determine a transfer function of a communication channel through which the spectrum-shaped output signal is to be transmitted, wherein the plurality of line coding steps are performed according to the transfer function; and
a second signal processing device for decoding output signals from the first signal processing device, the second signal processing device comprising:
a receiving unit configured to receive a spectrum shaped signal representing an original signal and comprising a plurality of multiplexed line-coded signals, and
a processing unit configured to decode the multiplexed line-coded signals, and to arrange the decoded line-coded signals as parts of the original signal to obtain the original signal.

23. A non-transitory information storage means, readable by a computer or a microprocessor, storing instructions of a computer program, for implementing a method according to claim 1, when the program is loaded and executed by the computer or microprocessor.

* * * * *